United States Patent
Akiyama et al.

(10) Patent No.: US 10,253,741 B2
(45) Date of Patent: Apr. 9, 2019

(54) HIGH-PRESSURE FUEL PUMP

(71) Applicant: Hitachi Automotive Systems, Ltd., Hitachinaka-shi, Ibaraki (JP)

(72) Inventors: Moritsugu Akiyama, Ibaraki (JP); Shigehiko Omata, Ibaraki (JP); Katsutoshi Kobayashi, Tokyo (JP); Kenichiro Tokuo, Ibaraki (JP)

(73) Assignee: Hitachi Automotive Systems, Ltd, Hitachinaka-shi (JP)

(*) Notice: Subject to any disclaimer, the term of this patent is extended or adjusted under 35 U.S.C. 154(b) by 0 days.

(21) Appl. No.: 15/566,060

(22) PCT Filed: Apr. 15, 2016

(86) PCT No.: PCT/JP2016/062050
§ 371 (c)(1),
(2) Date: Oct. 12, 2017

(87) PCT Pub. No.: WO2016/181755
PCT Pub. Date: Nov. 17, 2016

(65) Prior Publication Data
US 2018/0128229 A1    May 10, 2018

(30) Foreign Application Priority Data
May 12, 2015 (JP) .................. 2015-096996

(51) Int. Cl.
*F02M 63/00* (2006.01)
*F02M 59/02* (2006.01)
(Continued)

(52) U.S. Cl.
CPC .......... *F02M 63/026* (2013.01); *F02M 55/02* (2013.01); *F02M 59/46* (2013.01);
(Continued)

(58) Field of Classification Search
CPC ............. F02M 63/026; F02M 63/0077; F02M 63/0078; F02M 63/023; F02M 63/025;
(Continued)

(56) References Cited

U.S. PATENT DOCUMENTS 6,152,110 A * 11/2000 Miyajima .............. F02M 59/46
123/457
7,780,144 B2 * 8/2010 Van Der Linden .........................
F02M 59/462
137/539

(Continued)

FOREIGN PATENT DOCUMENTS

EP    1 411 238 A1    4/2004
EP    1 701 032 A1    9/2006
(Continued)

OTHER PUBLICATIONS

International Search Report (PCT/ISA/210) issued in PCT Application No. PCT/JP2016/062050 dated Jun. 21, 2016 with English translation (Four (4) pages).
(Continued)

*Primary Examiner* — George C Jin
(74) *Attorney, Agent, or Firm* — Crowell & Moring LLP

(57) ABSTRACT

An object is to suppress cavitation generated at a distal end portion of a seat face when a valve body and a seat portion collide with each other. In a relief valve of a fuel pump, an intersection between the seat face and a flow channel hole is formed at a position more distant than the seat portion formed of the valve body in a valve closing state and the seat face in order to suppress generation of cavitation bubbles when the valve body improves and releases high-pressure fuel.

5 Claims, 10 Drawing Sheets

(51) Int. Cl.
*F02M 63/02* (2006.01)
*F02M 55/02* (2006.01)
*F02M 59/46* (2006.01)
*F16K 15/04* (2006.01)

(52) U.S. Cl.
CPC ...... *F02M 59/462* (2013.01); *F02M 63/0036* (2013.01); *F02M 63/0054* (2013.01); *F02M 63/0077* (2013.01); *F02M 63/0078* (2013.01); *F02M 63/025* (2013.01); *F02M 63/0245* (2013.01); *F16K 15/044* (2013.01); *F02M 59/025* (2013.01); *F02M 2200/04* (2013.01)

(58) Field of Classification Search
CPC ........... F02M 63/0265; F02M 63/0275; F02M 63/005; F02M 63/0056; F02M 55/025; F02M 55/001; F02M 59/025; F02M 59/46; F02M 59/44; F02M 51/00
See application file for complete search history.

(56) References Cited

U.S. PATENT DOCUMENTS

| | | | |
|---|---|---|---|
| 2005/0076955 A1* | 4/2005 | Boehland | F02M 63/0036 137/539.5 |
| 2007/0068580 A1 | 3/2007 | Van Der Linden et al. | |
| 2011/0125387 A1* | 5/2011 | Suzuki | F02D 41/126 701/103 |
| 2011/0315909 A1* | 12/2011 | Oikawa | F02M 55/025 251/337 |
| 2013/0306033 A1 | 11/2013 | Kato et al. | |
| 2014/0117121 A1* | 5/2014 | Nong | F02M 51/061 239/584 |
| 2015/0013642 A1* | 1/2015 | Yudanov | F02M 63/0054 123/456 |
| 2015/0300339 A1* | 10/2015 | Morel | F02M 37/0058 417/559 |

FOREIGN PATENT DOCUMENTS

| | | |
|---|---|---|
| JP | 55-157163 U | 11/1980 |
| JP | 2001-173816 A | 6/2001 |
| JP | 2005-214303 A | 8/2005 |
| JP | 2006-242019 A | 9/2006 |
| JP | 2007-56989 A | 3/2007 |
| JP | 2007-533882 A | 11/2007 |
| JP | 2011-132941 A | 7/2011 |
| JP | 2011-220195 A | 11/2011 |
| JP | 2012-158987 A | 8/2012 |
| JP | 2013-241835 A | 12/2013 |
| JP | 2014-43820 A | 3/2014 |
| JP | 2014-105668 A | 6/2014 |
| JP | 2015-169080 A | 9/2015 |
| WO | WO 2014/083979 A1 | 6/2014 |

OTHER PUBLICATIONS

Japanese-language Written Opinion (PCT/ISA/237) issued in PCT Application No. PCT/JP2016/062050 dated Jun. 21, 2016 (Four (4) pages).

Japanese-language Office Action issued in counterpart Japanese Application No. 2017-517840 dated Jan. 8, 2019 with English translation (six (6) pages).

Extended European Search Report issued in counterpart European Application No. 16792480.2 dated Nov. 19, 2018 (seven (7) pages).

* cited by examiner

HIGH-PRESSURE FUEL PUMP

TECHNICAL FIELD

The present invention relates to a high-pressure fuel pump, and particularly to a high-pressure fuel pump provided with a relief valve mechanism.

BACKGROUND ART

A high-pressure pump described in PTL 1 includes a valve body and a seat portion that engages with the valve body to seat fuel in a relief path that relieves a high-pressure liquid from a high pressure side to a low pressure side, the seat portion being provided as a separate part to a main body. In addition, a slider is installed between the valve body and an elastic member biasing the valve body in a structure in which the seat portion is press-fitted into a hole dug in the main body. Further, a sliding path is restricted as the slider slides in a valve opening direction along a sliding inner wall. As a result, stress tilted with respect to a shaft of the elastic member is not applied, a lift amount of the relief valve is stabilized, and durability of a spring is improved according to the description in PTL 1.

CITATION LIST

Patent Literature

PTL 1: JP 2012-158987 A

SUMMARY OF INVENTION

Technical Problem

The related art has the following problems.

The relief valve of the high-pressure fuel pump has a function of suppressing generation of abnormal pressure at which discharge pressure becomes higher than an allowable value. Accordingly, when the discharge pressure becomes higher than set pressure, the valve body of the relief valve opens to release the high pressure.

When the condition that the discharge pressure is equal to or less than the allowable value is satisfied, the valve body needs to be seated on the seat portion to completely seal the fuel.

Here, when the valve opens and an intersection between a seat face and a flow channel hole is an edge on the high pressure side of the seat face in a part of a fuel path at the time of releasing the high pressure, fluid separation may occur in this edge portion at the time of releasing high-pressure fuel in some cases. Further, when the pressure becomes equal to or lower than saturated vapor pressure of the fuel, cavitation bubbles are generated. There is a risk of cavitation and erosion that the seat face is damaged by energy when the generated cavitation bubbles collapse. There is a risk that a gap may be formed between the valve body and the seat so that it is difficult to completely seal the fuel if this damage progresses.

Therefore, an object of the present invention is to provide a high-pressure fuel pump provided with a highly reliable relief valve mechanism that suppresses generation of cavitation and erosion on a seat face of the relief valve mechanism.

Solution to Problem

In order to solve the above-described problem, the present invention relates to a high-pressure fuel pump including: a pressurizing chamber to pressurize fuel; a discharge valve disposed on a downstream side of the pressurizing chamber; and a relief valve mechanism that causes fuel in a discharge path on the downstream side of the discharge valve to return to the pressurizing chamber or a low-pressure path. The relief valve mechanism includes: a relief path formed to be connected to the discharge path; a relief seat face connected to the relief path and formed to be enlarged toward the pressurizing chamber or the low-pressure path; and a relief valve body positioned to be closer to the pressurizing chamber side or the low-pressure path side than the relief seat face and seated on the relief seat face. An intersection between the relief path and the relief seat face is positioned closer to the discharge path side than an end portion of the relief valve body on the discharge path side.

Advantageous Effects of Invention

According to the present invention, it is possible to provide the high-pressure fuel pump provided with the highly reliable relief valve mechanism that suppresses the generation of cavitation and erosion on the seat face of the relief valve mechanism.

DESCRIPTION OF EMBODIMENTS

Hereinafter, embodiments of the present invention will be described with reference to the drawings.

Figure 1:
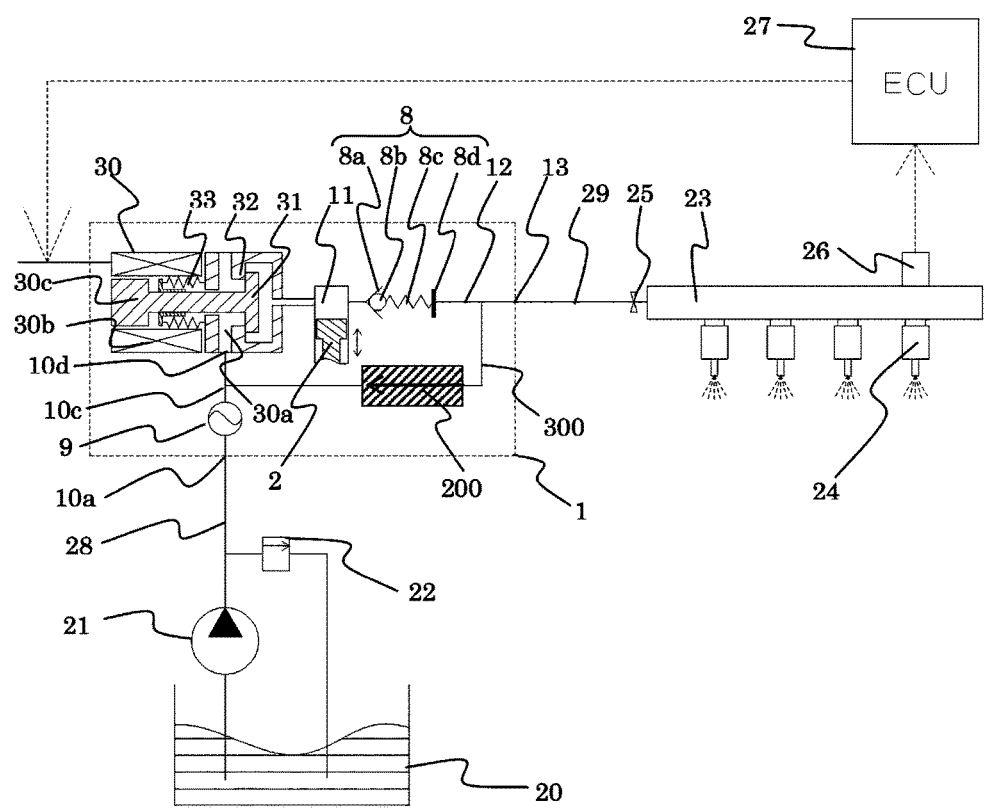
FIG. 1 is a view for describing an overall configuration diagram of a fuel supply system in which high-pressure fuel is caused to return to a low pressure side by a relief valve mechanism.

FIG. 1 illustrates an overall configuration of a system implementing the present invention. The part surrounded by the broken line in FIG. 1 illustrates a housing 1 of a high-pressure fuel supply pump, and the mechanisms and parts illustrated in this broken line are integrally incorporated therein.

Fuel in a fuel tank 20 is pumped up by a feed pump 21 and sent to a fuel intake opening 10a of the pump housing 1 through an intake pipe 28. The fuel having passed through the fuel intake opening 10a reaches an intake port 30a of an electromagnetic intake valve mechanism 30 forming a capacity variable mechanism via a pressure pulsation reduction mechanism 9 and an intake path 10c.

The electromagnetic intake valve mechanism 30 includes an electromagnetic coil 30b, and an electromagnetic plunger 30c is turned into the state of compressing a spring 33 and moving to the right in FIG. 1 in a state where the electromagnetic coil 30b is energized, and such a state is maintained. At this time, an intake valve body 31 attached to a distal end of the electromagnetic plunger 30c opens the intake opening 32 leading to a pressurizing chamber 11 of the high-pressure fuel supply pump. When there is no fluid pressure difference between the intake path 10c (the intake port 30a) and the pressurizing chamber 11 in a state where the electromagnetic coil 30b is not energized, the intake valve body 31 is biased in a valve closing direction (to the left in FIG. 1) by a biasing force of the spring 33, the intake opening 32 is turned into a closed state, and this state is maintained.

When a plunger 2 is displaced downward in FIG. 1 and is in an intake process state due to rotation of a cam of an internal combustion engine to be described later, the volume of the pressurizing chamber 11 increases and the fuel pressure therein decreases. When the fuel pressure in the pressurizing chamber 11 becomes lower than the pressure of the intake path 10c (the intake port 30a) in this process, a valve opening force (a force displacing the intake valve body 31 to the right in FIG. 1) caused by the fluid pressure difference of the fuel is generated in the intake valve body 31. This valve opening force makes the intake valve body 31 overcome the biasing force of the spring 33 and open, thereby opening the intake opening 32. When a control signal from an ECU 27 is applied to the electromagnetic intake valve mechanism 30 in this state, a current flows to the electromagnetic coil 30b of the electromagnetic intake valve 30, and the electromagnetic plunger 30c further compresses the spring 33 by a magnetic biasing force, moves to the right in FIG. 1, and maintains the state where the intake opening 32 is opened.

When the plunger 2 is shifted from the intake process to a compression process (a rising process from a lower start point to an upper start point) while maintaining a state of an input voltage is applied to the electromagnetic intake valve mechanism 30, the magnetic biasing force is maintained so that the intake valve body 31 still maintains the open valve state since the state of energizing the electromagnetic coil 30b is maintained. Although the volume of the pressurizing chamber 11 decreases along with the compressing movement of the plunger 2, the fuel, once taken into the pressurizing chamber 11, passes between the intake valve body 31 in the open valve state and the intake opening 32 again and is caused to return to the intake path 10c (the intake port 30a) in this state, the pressure of the pressurizing chamber 11 does not increase. This process is called a return process.

In the return process, when the electromagnetic coil 30b is de-energized, the magnetic biasing force acting on the electromagnetic plunger 30c is eliminated after a certain time (after a magnetic or mechanical delay time). Then, the intake valve body 31 is moved to the left in FIG. 1 by the biasing force of the spring 33 constantly acting on the intake valve body 31, thereby closing the intake opening 32. When the intake opening 32 is closed, the fuel pressure in the pressurizing chamber 11 increases along with the rise of the plunger 2 from this time. Further, when the fuel pressure in the pressurizing chamber 11 exceeds pressure which is larger than the fuel pressure of a discharge opening 13 by a predetermined value, the fuel remaining in the pressurizing chamber 11 is subjected to high-pressure discharge and is supplied to a common rail 23 via a discharge valve mechanism 8. This process is called a discharge process. As described above, the compression process of the plunger 2 includes the return process and the discharge process.

Although pressure pulsation occurs in the intake path due to the fuel having returned to the intake path 10c during the return process, this pressure pulsation only causes slight backflow from the intake opening 10a to the intake pipe 28, and most of the fuel return is absorbed by the pressure pulsation reduction mechanism 9.

It is possible to control the amount of high-pressure fuel to be discharged by controlling a cancellation timing of energization to the electromagnetic coil 30c of the electromagnetic intake valve mechanism 30. If the cancellation timing of energization to the electromagnetic coil 30b is made early, the proportion of the return process in the compression process is small, and the proportion of the discharge process is large. That is, the amount of fuel returning to the intake path 10c (the intake port 30a) is small, and the amount of fuel to be discharged at a high pressure is large. On the other hand, if the above-described energization cancellation timing is made late, the proportion of the return process in the compression process is large, and the proportion of the discharge process is small. That is, the amount of fuel returning to the intake path 10c is large, and the amount of fuel to be discharged at a high pressure is small. The above-described energization cancellation timing is controlled by a command from the ECU.

As described above, it is possible to set the amount of fuel to be discharged at high pressure to the amount required by the internal combustion engine as the ECU controls the cancellation timing of energization to the electromagnetic coil.

The discharge valve mechanism 8 is provided between an outlet side of the pressurizing chamber 11 and the discharge opening (discharge side pipe connection portion) 13 in the pump housing 1. The discharge valve mechanism 8 includes a seat member 8a, a discharge valve 8b, a discharge valve spring 8c, and a holding member (discharge valve stopper) 8d. In a state where there is no pressure difference of fuel between the pressurizing chamber 11 and the discharge opening 13, the discharge valve 8b is pressed against the seat member 8a by a biasing force generated by the discharge valve spring 8c and is turned into a closed valve state. When the fuel pressure in the pressurizing chamber 11 exceeds the pressure which is larger than the fuel pressure of the discharge opening 13 by the predetermined value, the discharge valve 8b opens against the discharge valve spring 8c, and the fuel in the pressurizing chamber 11 is discharged to the common rail 23 through the discharge opening 13.

The operation of the discharge valve 8b is restricted after opening and being brought into contact with the holding member 8d. Therefore, a stroke of the discharge valve 8b is appropriately determined by the holding member 8d. If the stroke is too large, the fuel to be discharged to the fuel discharge opening 13 flows back into the pressurizing chamber 11 again due to a closing delay of the discharge valve 8b, and thus, the efficiency as the high-pressure pump deteriorates. In addition, the discharge valve 8b is guided by the holding member 8d such that the discharge valve moves only in a stroke direction at the time of repeatedly moving to open and be closed. With the above-described configuration, the discharge valve mechanism 8 serves as a check valve that restricts a flowing direction of the fuel.

In this manner, the required amount of the fuel guided to the fuel intake opening 10a is pressurized to high pressure by a reciprocating motion of the plunger 2 in the pressurizing chamber 11 of the pump main body 1, and is pumped from the fuel discharge opening 13 to the common rail 23, which is a high-pressure pipe, through the discharge valve mechanism 8.

An injector 24 and a pressure sensor 26 are mounted to the common rail 23. The injector 24 is mounted in accordance with the number of cylinders of the internal combustion engine and injects the fuel into the cylinder with the opening and closing valve operation according to a control signal of the ECU 27.

Next, a description will be give regarding a fuel relief operation according to a first embodiment when abnormally high pressure is generated in a high-pressure portion, such as the common rail 23, due to failure of the injector 24 or the like.

The pump housing 1 is provided with a relief path 300 that communicates with a discharge path 12 with the intake path 10c, and the relief path 300 is provided with a relief valve mechanism 200 that restricts the flow of fuel only in one direction from the discharge path 12 to the intake path 10c. Provided are: the pressurizing chamber 11 to pressurize the fuel; the discharge valve mechanism 8 disposed on the downstream side of the pressurizing chamber 11; and the relief valve mechanism that causes the fuel in the discharge path 12 on the downstream side of the discharge valve mechanism 8 to return to the intake path 10c which is a low-pressure path.

Figure 2:
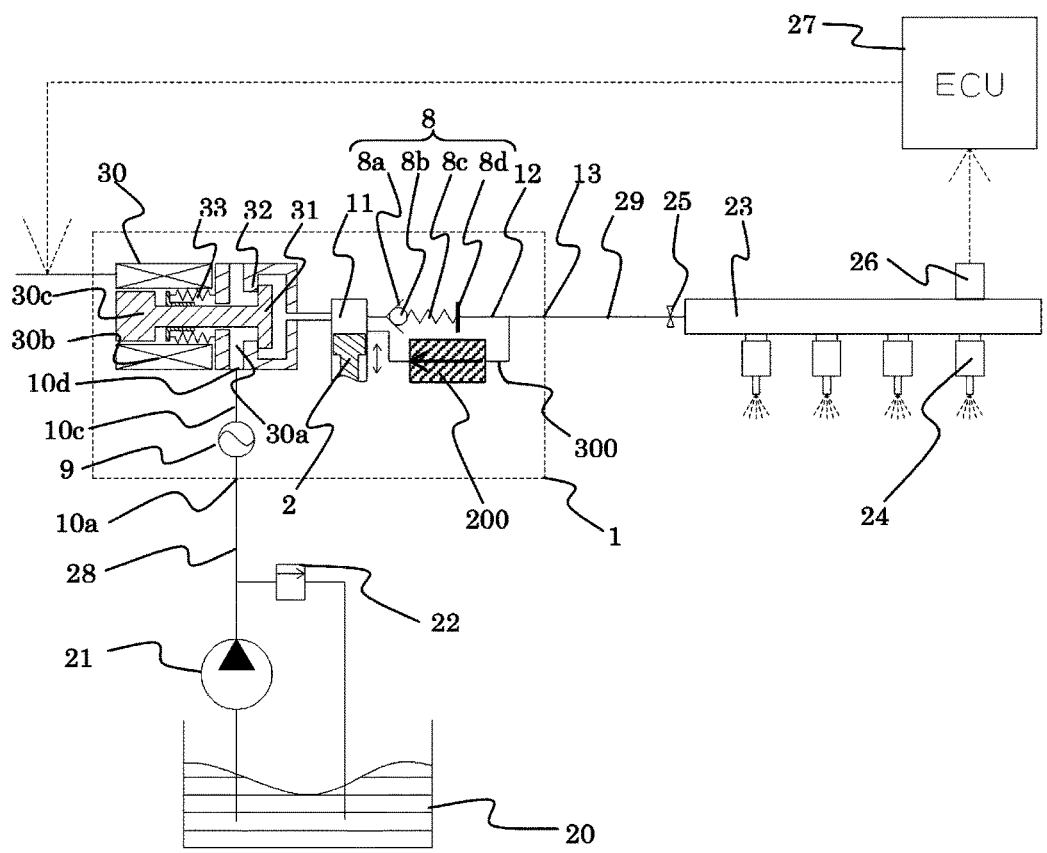
FIG. 2 is a view for describing an overall configuration diagram of a fuel supply system in which high-pressure fuel is caused to return to a pressurizing chamber side by a relief valve mechanism.

In addition, there is also a case where the fuel in the relief path 300 flows from the discharge path 12 into the pressurizing chamber 11 as illustrated in FIG. 2. That is, the relief valve mechanism 200 according to the present embodiment may be configured to cause the fuel in the discharge path 12 on the downstream side of the discharge valve mechanism 8 to return to the pressurizing chamber 11.

First Embodiment

Figure 3:
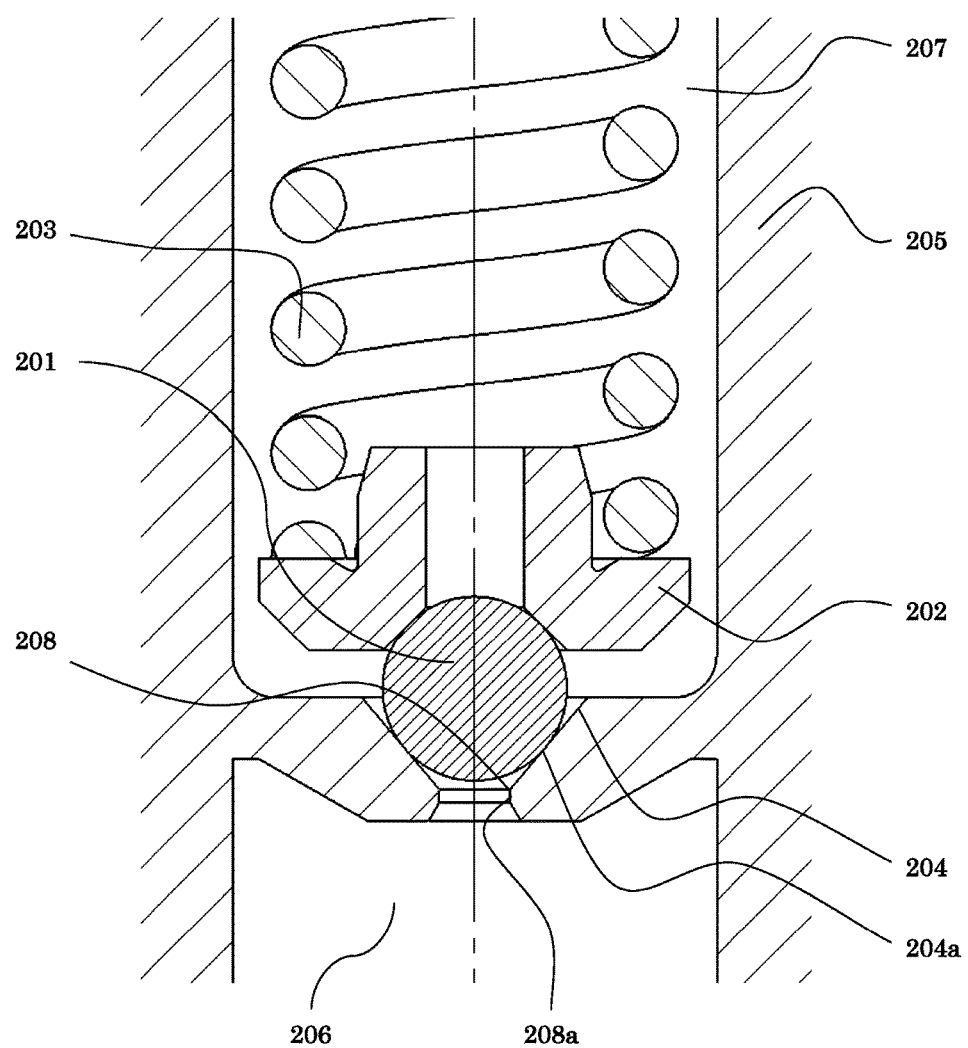
FIG. 3 is a cross-sectional view of a relief valve mechanism according to a first embodiment.

FIG. 3 illustrates a cross section of the relief valve mechanism according to the first embodiment of the present invention. The relief valve mechanism 200 includes: a relief path 208a formed to be connected to the discharge path 12; a relief seat face 204 connected to the relief path 208a and formed to be enlarged toward the pressurizing chamber 11 or the low-pressure path (the intake path 10c); and a relief valve body 201 positioned to be closer to a side of the pressurizing chamber 11 or the low-pressure path (the intake path 10c) than the relief seat face 204 and seated on the relief seat face 204. In addition, the relief valve mechanism 200 includes: a valve body presser 202 to press the relief valve body 201; an elastic member 203 to bias the relief valve body 201 toward the discharge path (a relief upstream side); and a housing 205 to house the elastic member 203 and the valve body presser 202 therein.

The relief seat face 204 has a seat portion 204a that is engaged with the relief valve body 201 to seal the fuel. A high-pressure chamber 206 constantly communicating with the discharge path 12 is formed on the upstream side of the relief valve body 201, and a low-pressure chamber 207 constantly communicating with the pressurizing chamber 11 or the low-pressure path (the intake path 10c) is formed on the downstream side of the relief valve body 201. The relief path 208a is formed from the high-pressure chamber 206 on the upstream side of the relief valve body 201 toward the relief seat face 204. The relief valve body 201 is biased to the seat portion 204a by the elastic member 203 against the pressure of the high-pressure fuel guided from the discharge flow path 12.

When the pressure of the discharge path 12 becomes abnormally high pressure and the pressure of the high-pressure chamber 206 increases, a fluid force thus acting on the relief valve body 201 may exceed the biasing force of the elastic member 203 in some cases. Then, the relief valve body 201 leaves the seat portion 204a, the relief valve mechanism 200 opens, and the relief path is turned into a communicating state. In addition, when the pressure of the high-pressure chamber 206 decreases again, the biasing force of the elastic member 203 exceeds the fluid force acting on the relief valve body 201, and the relief valve body 201 moves toward the seat portion 204a and seats on the seat portion 204a.

Figure 4:
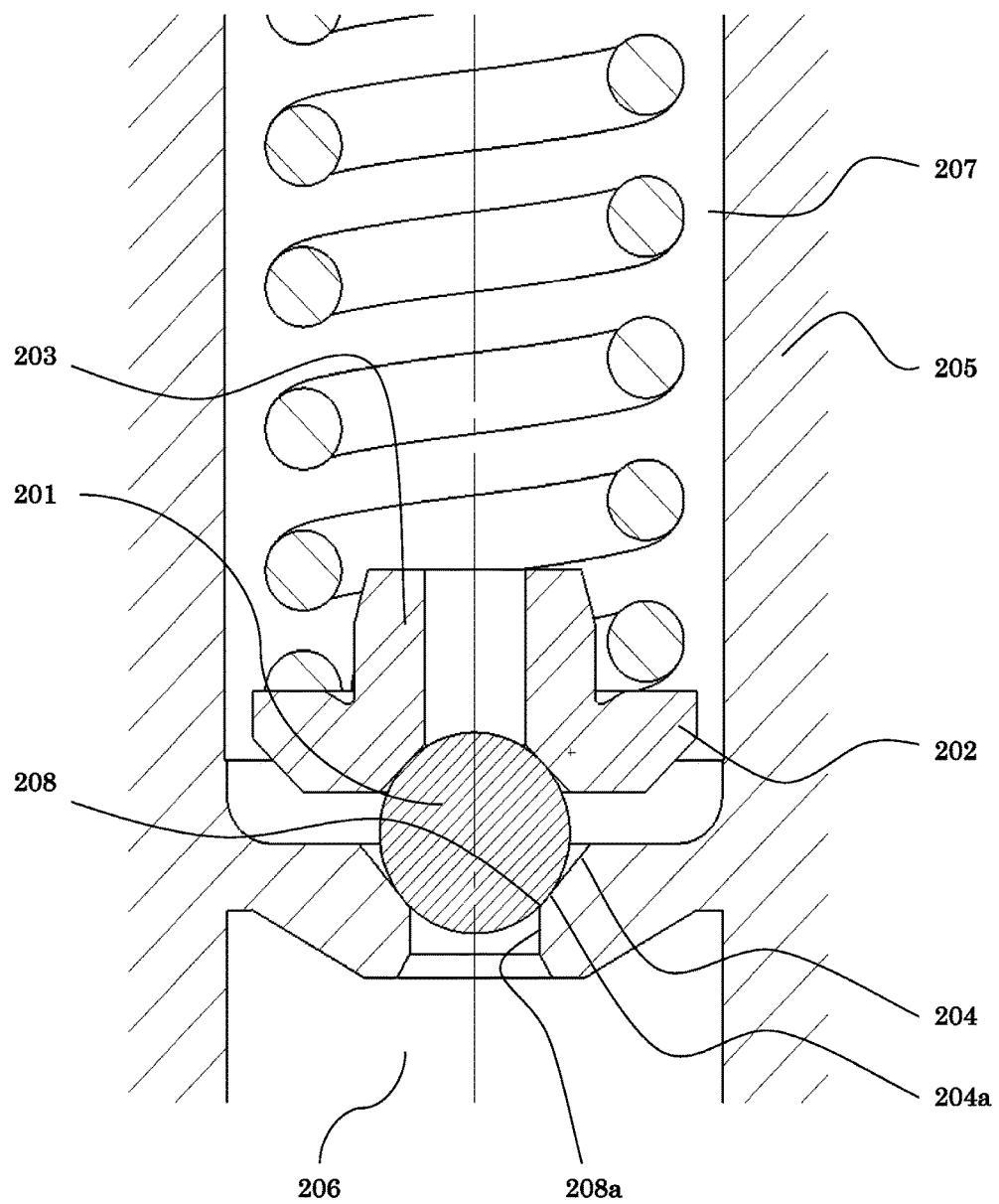
FIG. 4 is a cross-sectional view of an example of the relief valve mechanism.
Figure 6:
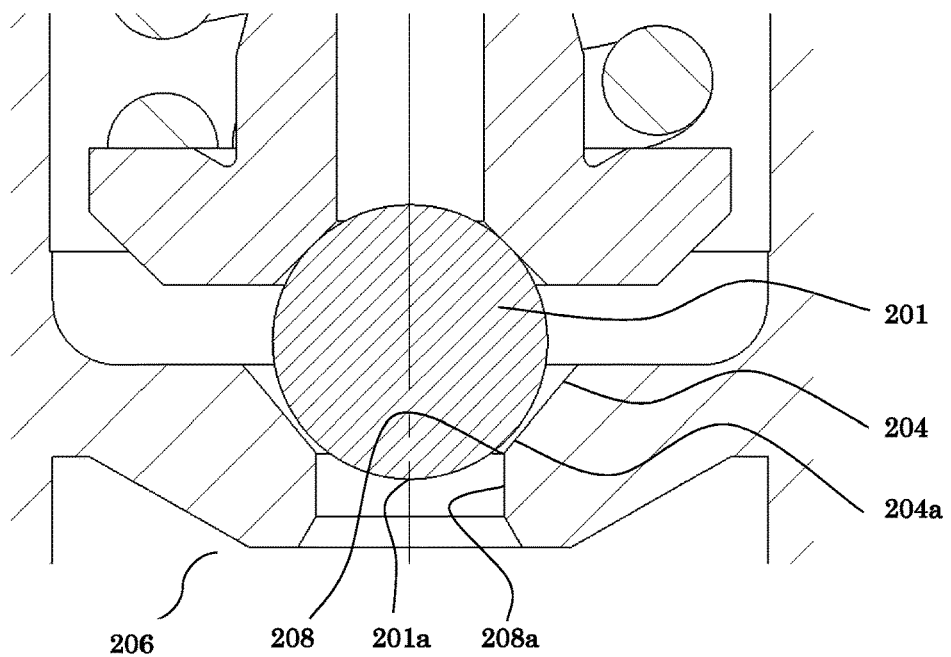
FIG. 6 is an enlarged cross-sectional view of the relief valve mechanism of FIG. 4.

FIG. 4 illustrates a cross-sectional view of an example of a relief valve mechanism. In addition, FIG. 6 is an enlarged cross-sectional view of the relief valve mechanism of FIG. 4. In the structure illustrated in FIGS. 4 and 6, a seat face distal end portion 208 on an inner periphery side of the relief seat face 204 is formed at a position close to the seat portion 204a. As a result of intensive studies, however, the present inventors have found out that cavitation and erosion is generated in the seat face distal end portion 208 according to the structure illustrated in FIG. 4.

Figure 8:
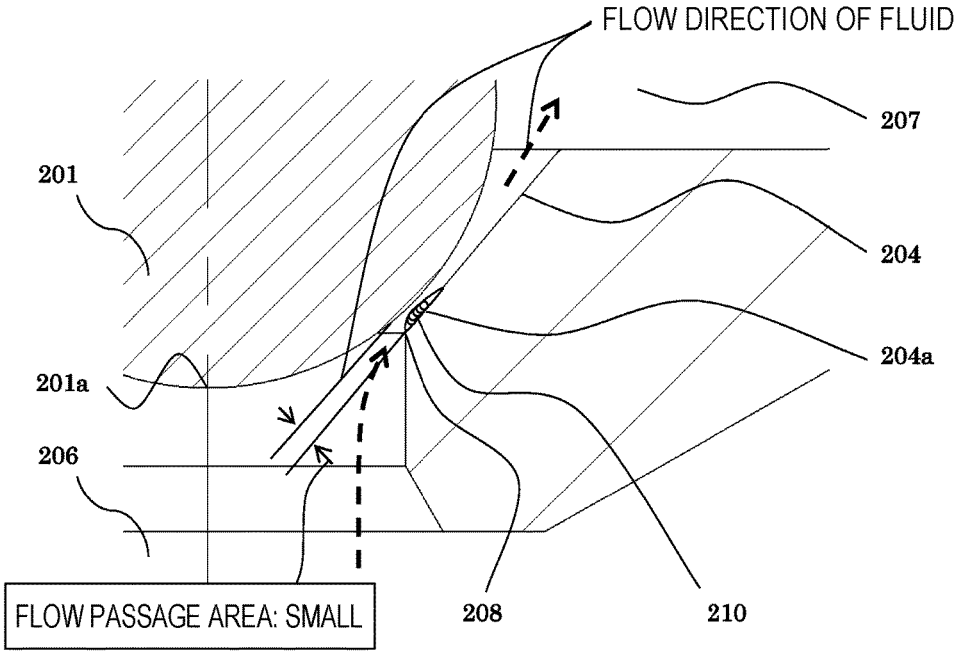
FIG. 8 is an enlarged view of a seat portion of the relief valve mechanism of FIG. 4.

FIG. 8 illustrates a state where cavitation is generated at the seat face distal end portion 208.

As described above, the relief valve body 201 leaves the seat portion 204a formed on the relief seat face 204 to open, and the relief path is turned in to the communicating state when the pressure of the discharge path 12 becomes the abnormally high pressure, the pressure of the high-pressure chamber 206 increases, and accordingly, the fluid force employed in the relief valve body 201 exceeds the biasing force of the elastic member 203. Then, high-pressure fuel passes through the relief path 208a from the high-pressure chamber 206, a flowing direction of the fuel is changed at the seat face distal end portion 208, and the fuel passes through a gap formed between the seat portion 204a and the relief valve body 201 and flows to the low-pressure chamber 207 on the downstream side of the relief valve body 201.

Since the flowing direction of the fuel is rapidly changed in the seat face distal end portion 208 when this high-pressure fuel flows, fluid separation is generated, and cavitation bubbles 210 are generated as the pressure of the fuel in a fluid separation portion where the pressure decreases becomes equal to or lower than saturated vapor pressure, in general.

The cavitation bubbles 210 generated in the seat face distal end portion 208 flow toward the seat portion 204a by the flow of the fuel from the high-pressure chamber 206 to the low-pressure chamber 207. When the fuel pressure around the cavitation bubbles 210 is recovered to the saturated vapor pressure or higher as leaving the fluid separation portion at low pressure, the cavitation bubbles 210 collapse so that a high impact force is generated. This impact force hits a wall surface of the seat portion 204a, and thus, the cavitation and erosion are generated. Hereinafter, a description will be given regarding a structure of the present embodiment to prevent the generation of cavitation and erosion in the seat face distal end portion 208 of the relief valve mechanism.

Figure 5:
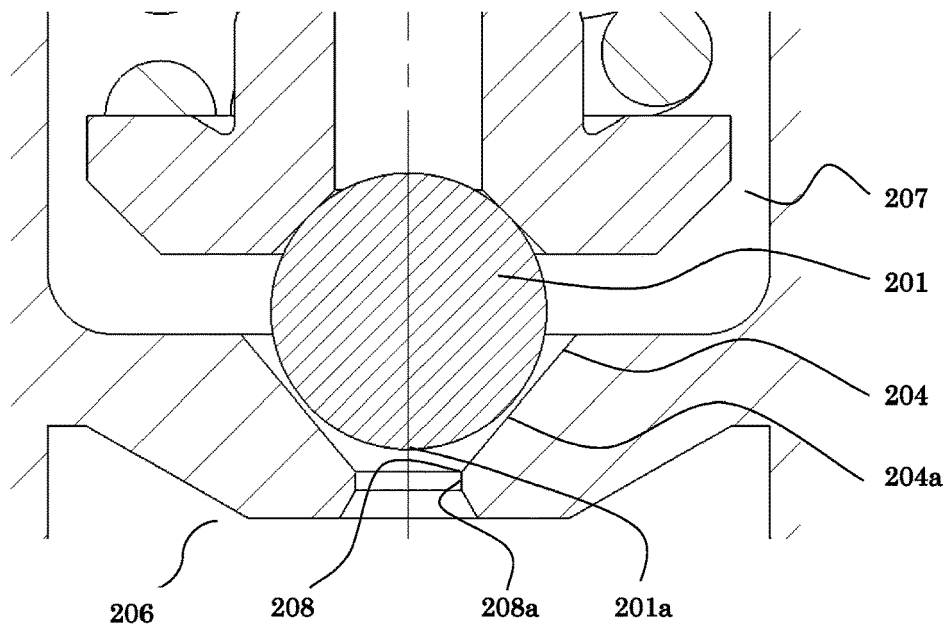
FIG. 5 is an enlarged cross-sectional view of the relief valve mechanism according to the first embodiment.
Figure 7:
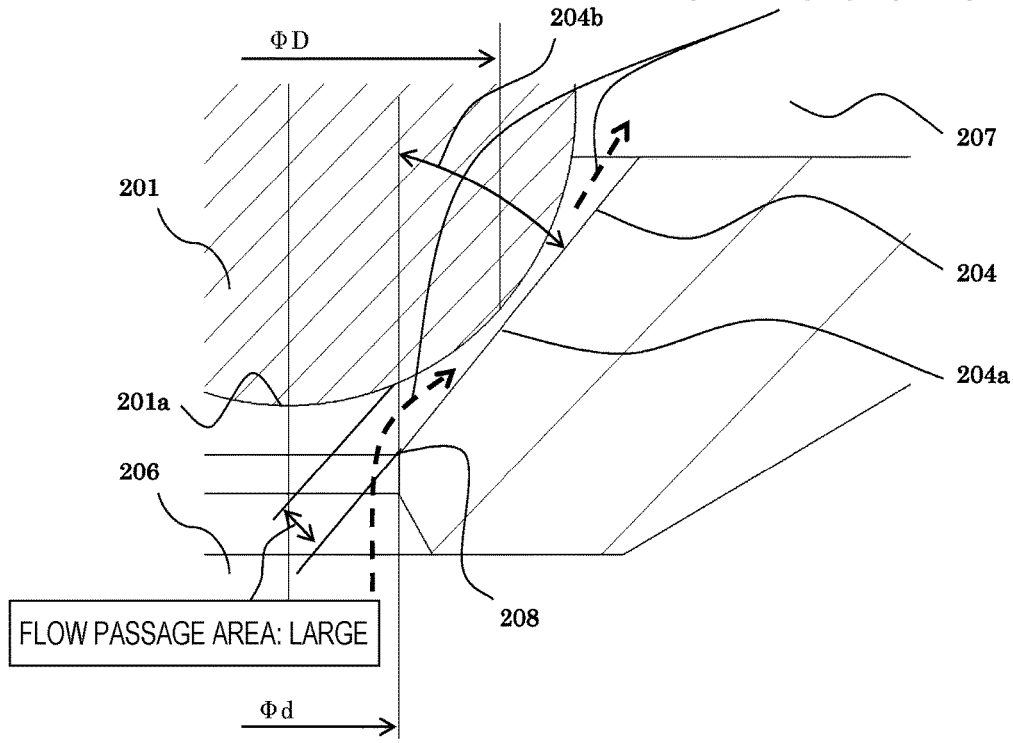
FIG. 7 is an enlarged view of a seat portion according to the first embodiment.

FIG. 5 is a view for describing the configuration of the relief valve mechanism according to the present embodiment. FIG. 7 illustrates an enlarged cross-sectional view of the relief valve mechanism of FIG. 5. As illustrated in FIG. 7, the seat face distal end portion 208 is disposed at a position more distant than the seat portion 204a in the present embodiment. Specifically, the seat face distal end portion 208 is disposed to be close to the higher pressure side than a high-pressure-side end portion 201a of the relief valve body 201. That is, an intersection between the relief path 208 and the relief seat face 204 is positioned to be closer to the discharge path 12 side than the end portion of the relief valve body on the discharge path 12 side.

Accordingly, although the flowing direction of the fuel is rapidly changed in the seat face distal end portion 208 when the high-pressure fuel flows, it is possible to secure a sufficient fuel flow path area since the gap between the seat face distal end portion 208 and the relief valve body 201 can be made large. Therefore, a flow rate of fuel is low, the generation of fluid separation can be suppressed, and accordingly, the pressure of fuel in the fluid separation portion does not fall to be equal to or lower than the saturated vapor pressure. Accordingly, it is possible to suppress the generation of the cavitation bubbles 210 and to configure the relief valve mechanism with high reliability.

Figure 12:
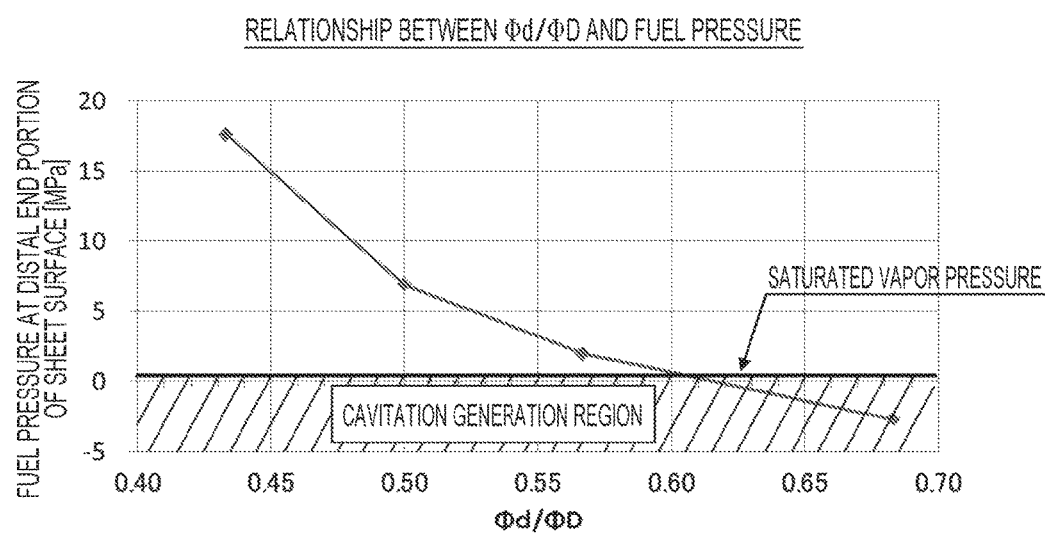
FIG. 12 is a graph illustrating a relationship between $\Phi d/\Phi D$ and fuel pressure a seat face distal end portion.

In addition, when a diameter in a case where a contact portion (seal portion) of the relief valve body 201 with the seat portion 204a is a spherical shape is set as ΦD and a diameter of the seat face distal end portion 208 of the relief path 208a is set as Φd, a ratio determined by Φd/ΦD may be set to 0.6 or less. That is, the diameter Φd of the relief path 208 is formed to be equal to or smaller than 0.6 times of the seat diameter ΦD of the relief seat face. As a result, it was possible to confirm that the flow rate of fuel is low, the generation of fluid separation can be suppressed, and generation of cavitation bubbles 210 can be suppressed, with a fluid analysis simulation. FIG. 12 illustrates a relationship between Φd/ΦD obtained by the fluid analysis simulation and the fuel pressure in the seat face distal end portion. The vertical axis represents the fuel pressure in the seat face distal end portion, and the horizontal axis represents the ratio of Φd/ΦD. Since the cavitation is generated when the fuel pressure in the seat face distal end portion falls to be equal to or lower than the saturated vapor pressure illustrated in the drawing, it is possible to suppress the generation of cavitation by setting the ratio of Φd/ΦD to 0.6 or less. Alternatively, the diameter of the relief path 208 may be formed to be equal to or smaller than the half of a diameter of the relief valve body 201. As a result, the flow rate of fuel is small, the generation of fluid separation can be suppressed, and the generation of the cavitation bubbles 210 can be suppressed, which is similar to the above description.

Here, the relief seat face 204 is polished from the intersection (the seat distal end portion 208) between the relief path 208 and the relief seat face 204 to the side of the pressurizing chamber 11 or the low-pressure path (the intake path 10c). If a surface roughness of the seat face is poor, the fluid separation is easily generated since such a state is the same as a state where innumerable edges are formed on the seat face itself. In the present embodiment, the polishing is performed on the seat face in order to suppress the generation of fluid separation on the seat face. In the present embodiment, the intersection (the seat distal end portion 208) is formed without an R portion as the relief path 208 and the relief seat face 204 intersect each other at a predetermined angle as illustrated in FIG. 5. Although it is possible to suppress the cavitation by providing the R portion on the seat face distal end portion 208, the formation of the R portion requires high manufacturing cost, and it is difficult to secure the accuracy of the R portion in terms of manufacturing. On the other hand, it is possible to obtain the structure to suppress the cavitation without requiring the formation of the R portion in the present embodiment as described above, and thus, it is possible to reduce the manufacturing cost and easily perform the manufacturing.

Incidentally, the relief path 208 is formed substantially in parallel with an extension and contraction direction of the spring portion 203 that biases the relief valve body 201. Further, an angle 204b between the relief seat face 204 and the relief path 208a is formed so as to be tilted to 50 degrees or smaller. That is, the relief seat face 204 is formed to be tilted to an outer periphery side at an angle of 50 degrees or smaller with respect to the relief path 208. As a result, it is possible to install the seat face distal end portion 208 to be closer to the high pressure side than the high-pressure-side end portion 201a of the relief valve body 201. Accordingly, although the flowing direction of the fuel is rapidly changed in the seat face distal end portion 208 when the high-pressure fuel flows, it is possible to secure a sufficient fuel flow path area since the gap between the seat face distal end portion 208 and the relief valve body 201 can be made large. Therefore, the flow rate of fuel is low, the generation of fluid separation can be suppressed, and accordingly, it is possible to suppress the generation of the cavitation bubbles 210 while preventing the pressure of fuel in the fluid separation portion from falling to be equal to or lower than the saturated vapor pressure.

As described above, an intersection between the seat face and the flow channel hole is installed at a position distant from the seat portion, which is a portion where the fuel flow path area becomes minimum, when the high-pressure fuel is released at the time of opening the valve in the present embodiment. Accordingly, it is possible to secure a wider fuel channel path, and thus, it is possible to lower the flow rate at an edge portion where fluid separation is likely to occur. Therefore, the possibility that the pressure at the edge portion falls to be equal to or lower than the saturated vapor pressure is suppressed, and the generation of cavitation bubbles can be reduced, and thus, it is possible to supply the relief valve mechanism with higher reliability. Accordingly, it is possible to suppress the generation of cavitation and erosion, and thus, it is possible to completely seal the fuel when the valve body is in the state of being seated on the seat portion.

Incidentally, the relief valve body 201 has the spherical shape in FIG. 7, but the relief valve body 201 does not necessarily have the spherical shape, but may have, for example, a conical shape or a shape obtained by cutting a distal end of a conical shape, or may have a spherical shape only in a portion in contact with the seat portion 204a. Even in this case, it is desirable to dispose the seat portion 204a substantially at a center portion on the seat face 204 as illustrated in FIG. 5. Accordingly, it is possible to obtain the above-described action and effects that have been described with reference to FIG. 5.

Second Embodiment

Figure 9:
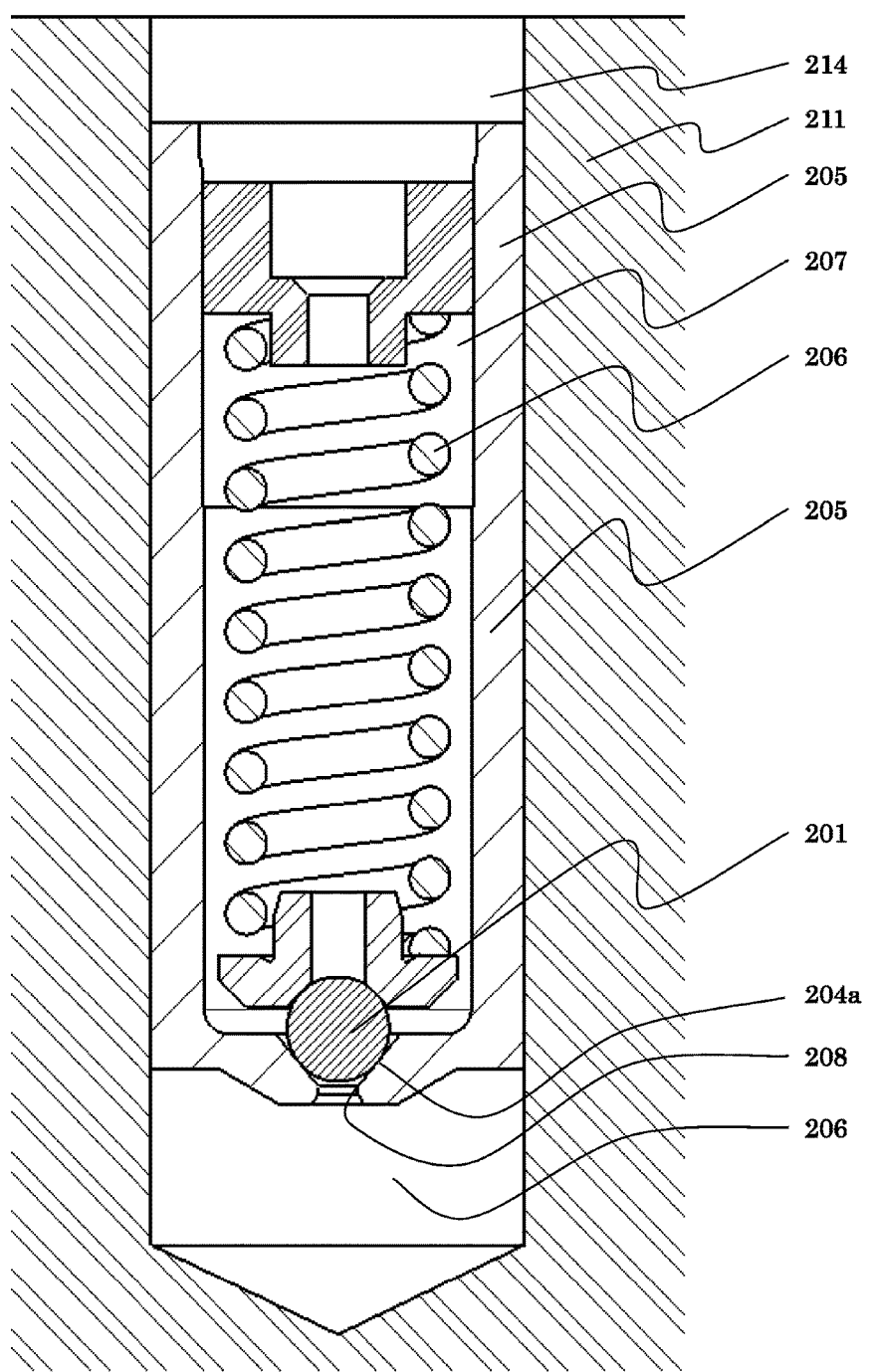
FIG. 9 is a view illustrating a relief valve mechanism according to a second embodiment.

FIG. 9 illustrates a second embodiment of the present invention. A housing 205, which surrounds a low-pressure chamber 207 present on the downstream side with respect to a relief valve body 201, and a seat portion 204 are unitized to have an integrated structure. A hole 214 is dug in a main body 211. The housing 205 and the seat portion 204a having the integrated structure are formed as a separate part with respect to the main body 211. The housing 205 and the seat portion 204a having the integrated structure are installed in the hole 214 dug in the main body 211. If the features described in the first embodiment are granted and a seat distal end portion 208 is formed at a position distant from the seat portion 204a in a relief valve mechanism in this configuration, the effects described in the first embodiment are obtained.

Third Embodiment

Figure 10:
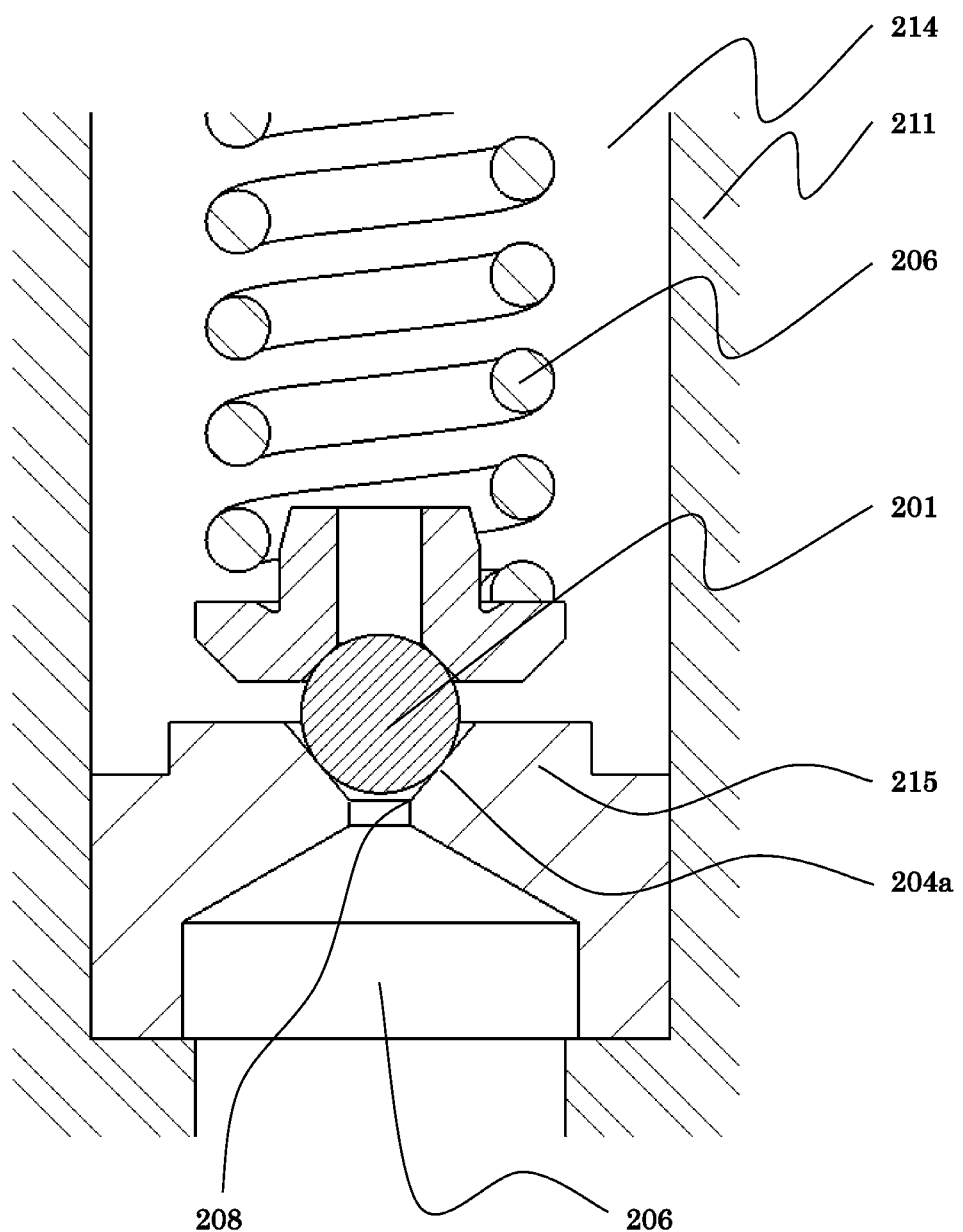
FIG. 10 is a view illustrating a relief valve mechanism according to a third embodiment.

FIG. 10 illustrates a third embodiment of the present invention. It is configured such that a seat member 215 is formed as a separate part with respect to a main body 211, a seat portion 204a has a structure to surround a high-pressure chamber 206 on the upstream side and is installed in a hole 214 dug in the main body 211. If the features described in the first embodiment are granted and a seat distal end portion 208 is formed at a position distant from the seat portion 204a in a relief valve mechanism in this configuration, the effects described in the first embodiment are obtained.

Fourth Embodiment

Figure 11:
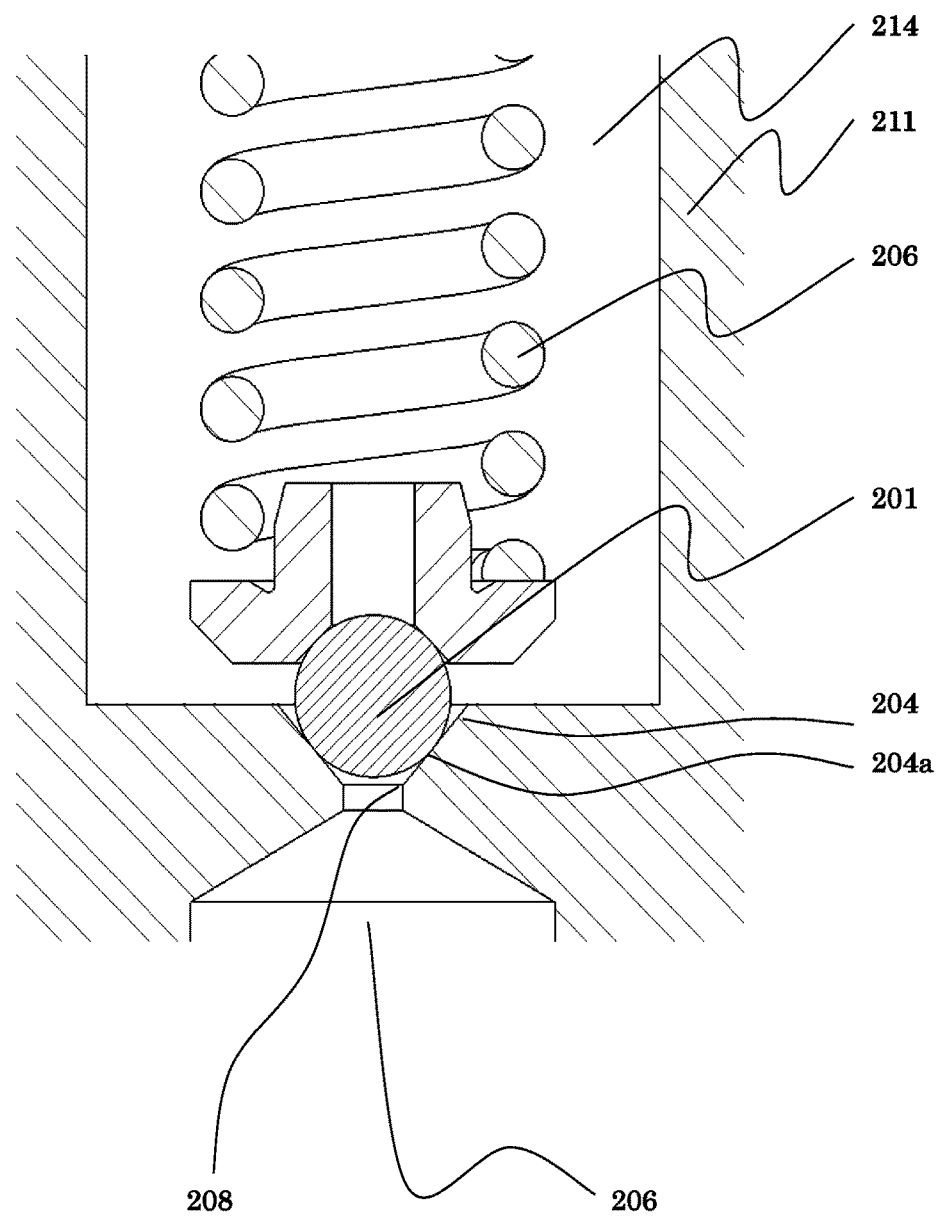
FIG. 11 is a view illustrating a relief valve mechanism according to a fourth embodiment.

FIG. 11 illustrates a fourth embodiment of the present invention. A main body 211 is engraved directly to forma relief seat face 204.

If the features described in the first embodiment are granted and a seat distal end portion 208 is formed at a position distant from the seat portion 204a in a relief valve mechanism in this configuration, the same effects described in the first embodiment are obtained.

REFERENCE SIGNS LIST 1 pump housing
2 plunger
8 discharge valve mechanism
9 pressure pulsation reduction mechanism
10c suction path
11 pressurizing chamber
12 discharge path
20 fuel tank
23 common rail
24 injector
26 pressure sensor
30 electromagnetic intake valve mechanism
200 relief valve mechanism
201 relief valve body
201a high pressure side end portion of a relief valve body
202 valve body presser
203 elastic member
204 relief seat face
204a seat portion
204b angle
205 housing
206 high-pressure chamber
207 low-pressure chamber
208 seat face distal end portion
208a relief path
209 high speed vibration
210 cavitation bubbles
211 main body
213 seat portion
214 hole
215 seat member

The invention claimed is:
1. A high-pressure fuel pump comprising:
a pressurizing chamber to pressurize fuel;
a discharge valve disposed on a downstream side of the pressurizing chamber; and
a relief valve mechanism that causes fuel in a discharge path on the downstream side of the discharge valve to return to the pressurizing chamber or a low-pressure path, wherein the relief valve mechanism comprises:
a relief path formed to be connected to the discharge path;
a relief seat face connected to the relief path and formed to be enlarged toward the pressurizing chamber or the low-pressure path; and a relief valve body positioned to be closer to the pressurizing chamber side or the low-pressure path side than the relief seat face and seated on the relief seat face, and
an intersection between the relief path and the relief seat face is positioned closer to the discharge path side than an end portion of the relief valve body on the discharge path side
wherein the relief seat face is polished on the pressurizing chamber side of the low pressure path side from an intersection between the relief path and the relief seat face
wherein a diameter of the relief path is equal to or smaller than 0.6 times of a seat diameter of the relief seat face.
2. A high-pressure fuel pump comprising:
a pressurizing chamber to pressurize fuel;
a discharge valve disposed on a downstream side of the pressurizing chamber; and
a relief valve mechanism that causes fuel in a discharge path on the downstream side of the discharge valve to return to the pressurizing chamber or a low-pressure path,
wherein the relief valve mechanism comprises: a relief path formed to be connected to the discharge path; a relief seat face connected to the relief path and formed to be enlarged toward the pressurizing chamber or the low-pressure path; and a relief valve body positioned to be closer to the pressurizing chamber side or the low-pressure path side than the relief seat face and seated on the relief seat face, and
a diameter of the relief path is equal to or smaller than 0.6 times of a seat diameter of the relief seat face.
3. A high-pressure fuel pump comprising:
a pressurizing chamber to pressurize fuel;
a discharge valve disposed on a downstream side of the pressurizing chamber; and
a relief valve mechanism that causes fuel in a discharge path on the downstream side of the discharge valve to return to the pressurizing chamber or a low-pressure path,
wherein the relief valve mechanism comprises: a relief path formed to be connected to the discharge path; a relief seat face connected to the relief path and formed to be enlarged toward the pressurizing chamber or the low-pressure path; and a relief valve body positioned to be closer to the pressurizing chamber side or the low-pressure path side than the relief seat face and seated on the relief seat face, and
a diameter of the relief path is formed to be equal to or smaller than a half of a diameter of the relief valve body.
4. The high-pressure fuel pump according to claim 1, wherein
an intersection is formed without an R portion as the relief path and the relief seat face intersect each other at a predetermined angle.

5. The high-pressure fuel pump according to claim 1, wherein
the relief path is formed substantially in parallel with an extension and contraction direction of a spring portion that biases the relief valve body, and
the relief seat face is formed to be tilted to an outer periphery side at an angle of 50 degrees or smaller with respect to the relief path.

\* \* \* \* \*